July 8, 1924.

A. A. GLIDDEN 1,500,307

SECTIONAL CUSHION TIRE

Filed May 8, 1923     2 Sheets-Sheet 1

Inventor:
Alfred A. Glidden,
by *Spear Middleton Donaldson & Hall*
Attys.

July 8, 1924.

A. A. GLIDDEN 1,500,307

SECTIONAL CUSHION TIRE

Filed May 8, 1923  2 Sheets-Sheet 2

Inventor:
Alfred A. Glidden,
by Spear Middleton Donaldson & Hall
Attys.

Patented July 8, 1924.

1,500,307

UNITED STATES PATENT OFFICE.

ALFRED A. GLIDDEN, OF WATERTOWN, MASSACHUSETTS, ASSIGNOR TO HOOD RUBBER COMPANY, OF WATERTOWN, MASSACHUSETTS, A CORPORATION OF MASSACHUSETTS.

SECTIONAL CUSHION TIRE.

Application filed May 8, 1923. Serial No. 637,523.

*To all whom it may concern:*

Be it known that I, ALFRED A. GLIDDEN, a citizen of the United States, and resident of Watertown, in the county of Middlesex and State of Massachusetts, have invented certain new and useful Improvements in Sectional Cushion Tires, of which the following is a specification.

My present invention relates to improvements in cushion tires of the type customarily used for heavy motor vehicles, and the method of making the same.

Such motor trucks vary greatly in size and weight, and it has been customary to provide tires varying in width according to the size of the truck, which necessitates dealers carrying a much larger assortment of tires than would otherwise be necessary.

The present invention aims to provide a tire composed of sections, more or less of which may be assembled upon the wheel rim, to provide a tire of the desired width, which tire will have substantially the appearance of a unitary tire, and which will be possessed of the requisite non-skid properties.

An embodiment of my invention is illustrated in the accompanying drawing, in which:—

Figure 1:
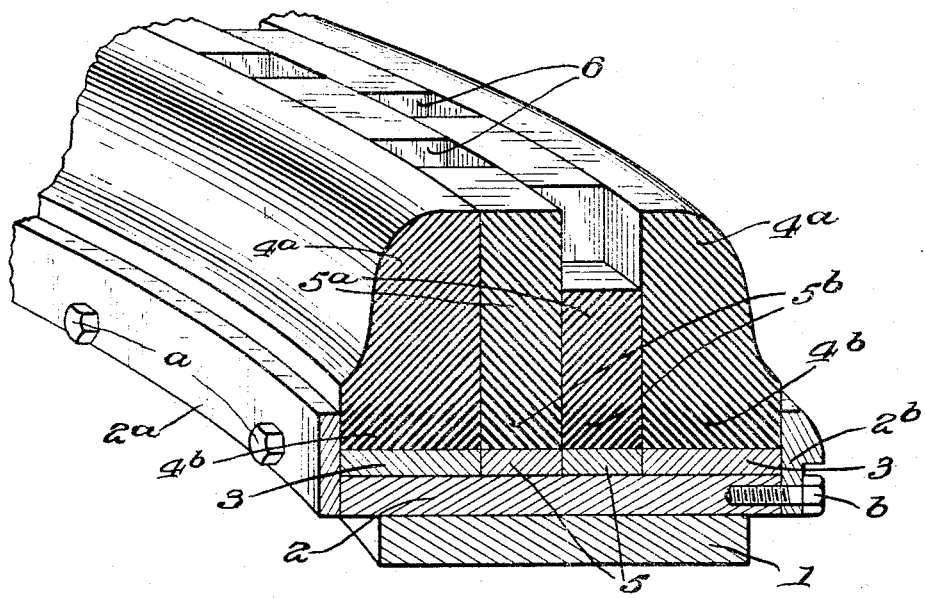
Figure 1 is a sectional perspective view of a portion of a tire constructed in accordance with my invention.

Referring by reference characters to these drawings, the numeral 1 designates the wheel felloe, which may be of the ordinary or any desired construction, the spokes which carry the felloe being omitted for simplicity of illustration. 2 designates the tire band, which is designed to carry the cushion sections, and which tire band, of course, corresponds in width to the width of tire desired.

Assembled on this tire band, in juxtaposed relation, or side by side, is a plurality of annular cushion tire elements comprising outer members for forming the side edges of the tire, and intermediate members which are variable in number, corresponding to the width of tire carrying band 2, or, in other words, to the desired width of tire.

Removable means must be provided for permitting the cushion tire elements to be applied to, or removed from, the band 2, and for holding them in place during service, and such means may take the form of a clamping ring $2^a$ secured to one side of the band 2 by tap screws $a$, which confines the elements between it and an abutment $2^b$ on the opposite side, which latter is preferably in the form of a ring similar to $2^a$ and removably held by tap screws $b$.

The outer cushion elements comprise annular metal bands 3 which have an interior diameter corresponding to the exterior diameter of the band 2, and surrounding cushion rings of resilient material such as rubber, preferably, in turn comprising relatively hard rubber inner portions $4^b$ and relatively soft outer portions $4^a$ vulcanized together and to the ring 3.

Figure 3:
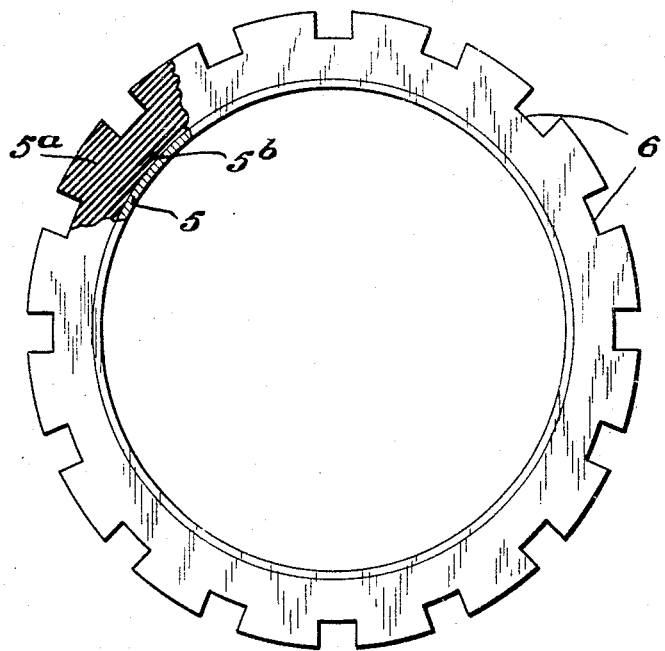
Fig. 3 is a detail view of one of the intermediate rings, on a much smaller scale.
Figure 2:
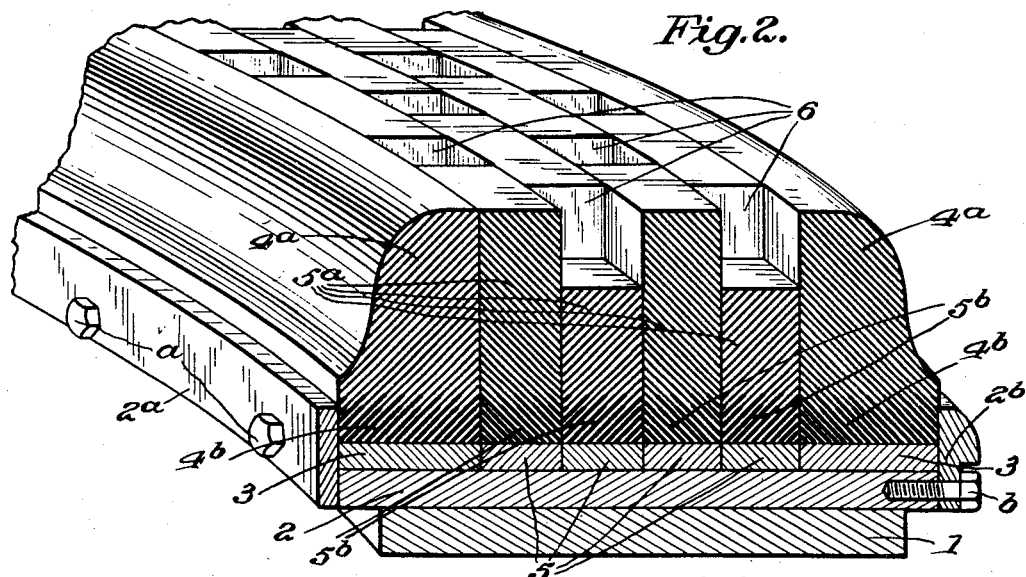
Fig. 2 is a similar view showing a larger number of cushion sections assembled upon a wider rim to make a wider tire.
Figure 4:
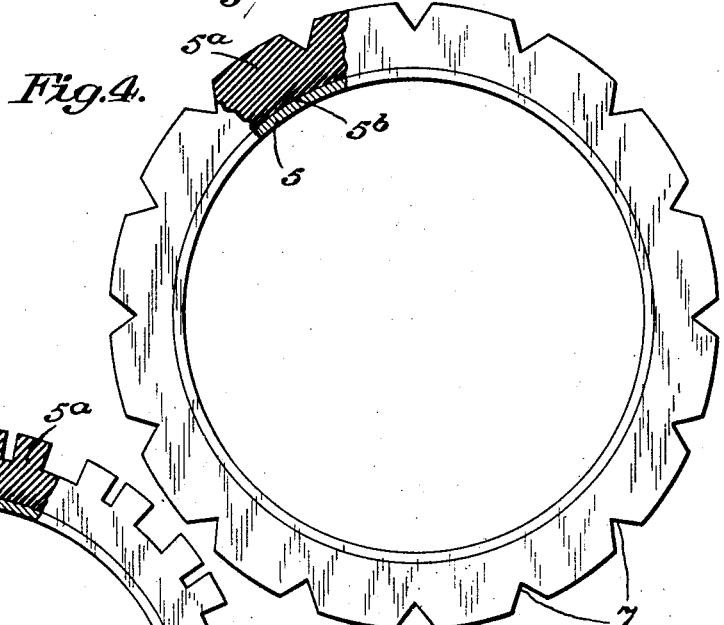
Figs. 4 and 5, are similar views of modifications.
Figure 5:
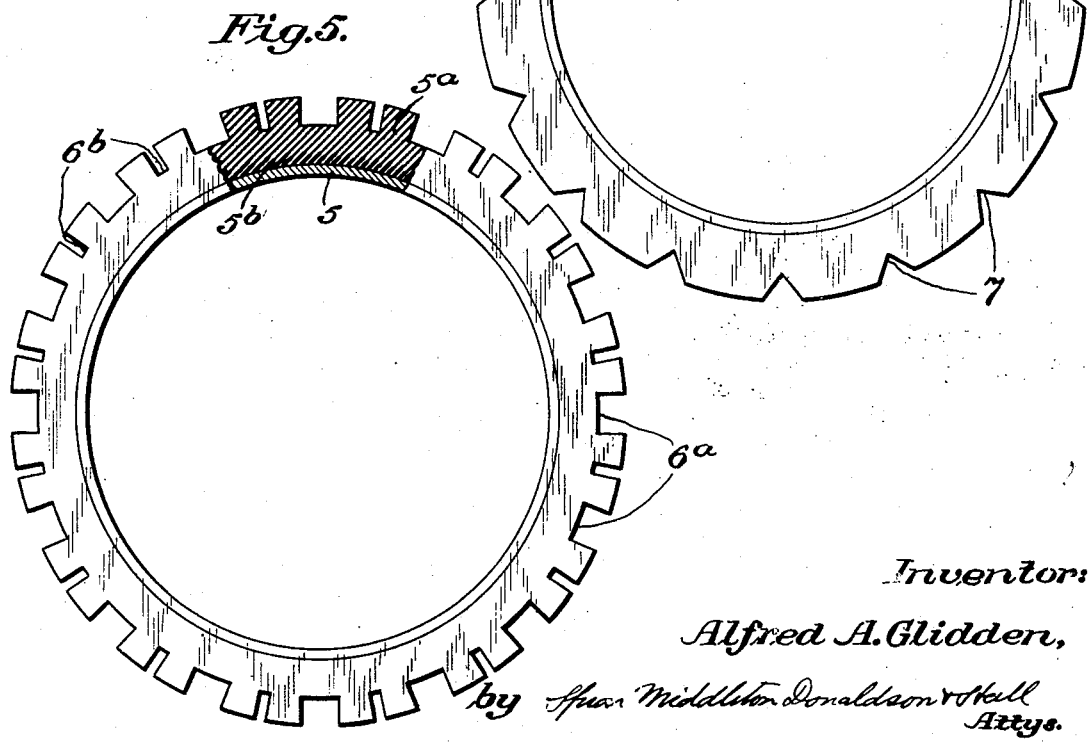

Between these margin forming members is, or are, arranged one or more intermediate cushion tire elements, each of which comprises a carrying band 5, surrounding layer of hard rubber $5^b$ and outer tread portion $5^a$, all vulcanized together, and the tread portion of each section is provided with a plurality of transverse recesses which may be of substantially rectangular form, as indicated at 6, Fig. 3, or of V-shaped form, as shown at 7 in Fig. 4, or a combination of alternating wide and narrow slots or recesses, as shown at $6^a$ and $6^b$, Fig. 5, or of any other shape desired.

When a plurality of these intermediate sections are used, the slots are arranged out of alignment, or in staggered relation, as shown.

By the construction above described, I produce a tire composed of sections which may be carried in stock and more or less of them readily assembled upon wide or narrow carrying rims, according to the size of tire desired.

I also effect a material reduction in the cost of production due to the fact, first, that the manufacturer does not have to carry so large a stock of molds, or such large molds as are required for the larger sizes of tires, and second, that I can secure the pockets or non-skid recesses, by a simpler form of mold and one that is easier and less expensive to manufacture.

When a tire, such as above described, runs over an obstruction in the road, the rings, being separate units, adjust themselves more readily to the contour of the obstruction and do not produce so much of a strain on the tire composition as in a unit tire. If a ring is badly injured, the tire can be disassembled and a new ring substituted for the injured one.

Beneficial vulcanization effects also result from this construction as a large tire, say 10, 12 or 14 inch, has such a large mass of composition on it that it takes a long time for the heat to penetrate into the interior of the mass; in fact, inasmuch as the heat is radiated from the inside face of a mold through the outside of the tire, it is practically impossible to make a tire that has the same degree of vulcanization throughout the body.

By dividing it up into these rings, applicant has less material to vulcanize, and get an even vulcanization throughout the mass and do it in less time. Furthermore, by using double molds, less space in the vulcanizer is required.

Having thus described my invention, what I claim is:—

1. In a sectional cushion tire and in combination, an annular carrying rim having removable tire retaining means at one edge thereof, and a sectional cushion tire removably carried thereby and comprising a plurality of annular members, each of which in turn comprises an annular metal carrying band and an annular cushion tire section fast thereon, certain of said tire sections having transversely disposed grooves or recesses in their peripheries.

2. In a sectional cushion tire, and in combination, an annular carrying rim having removable tire retaining means at one edge, and a removable sectional cushion tire carried thereby comprising a plurality of annular carrying bands overlying said rim and juxtaposed to each other, the outside bands carrying cushion rings having continuous peripheries, and the intermediate bands carrying cushion rings provided with transversely recessed peripheries.

3. In a sectional cushion tire, and in combination, an annular carrying rim having removable tire retaining means at one edge, and a removable sectional cushion tire carried thereby comprising a plurality of annular carrying bands overlying said rim and juxtaposed to each other, the outside bands carrying cushion rings having continuous peripheries, and the intermediate bands carrying cushion rings provided with transversely recessed peripheries, said intermediate rings being arranged with their respective recesses in staggered relation.

In testimony whereof, I affix my signature.

ALFRED A. GLIDDEN.